US011995799B2

(12) United States Patent
Itoh

(10) Patent No.: US 11,995,799 B2
(45) Date of Patent: *May 28, 2024

(54) IMAGE PROCESSING APPARATUS, IMAGE PROCESSING METHOD, AND NON-TRANSITORY COMPUTER-READABLE STORAGE MEDIUM

(71) Applicant: CANON KABUSHIKI KAISHA, Tokyo (JP)

(72) Inventor: Yasuhiro Itoh, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/720,785

(22) Filed: Apr. 14, 2022

(65) Prior Publication Data
US 2022/0237745 A1 Jul. 28, 2022

Related U.S. Application Data

(63) Continuation of application No. 16/787,541, filed on Feb. 11, 2020, now Pat. No. 11,334,966.

(30) Foreign Application Priority Data

Feb. 18, 2019 (JP) ................. 2019-026670

(51) Int. Cl.
*G06T 5/00* (2006.01)
*G06T 5/50* (2006.01)
*G06F 3/04847* (2022.01)

(52) U.S. Cl.
CPC .................. *G06T 5/00* (2013.01); *G06T 5/50* (2013.01); *G06F 3/04847* (2013.01);
(Continued)

(58) Field of Classification Search
CPC ......... F21V 5/08; F21V 14/04; G02B 5/0273; G02B 19/0014; G06T 5/003; G06T 5/20
See application file for complete search history.

(56) References Cited

U.S. PATENT DOCUMENTS 6,538,579 B1 * 3/2003 Yoshikawa .............. G08G 1/04
348/148
6,711,280 B2 * 3/2004 Stafsudd .............. G06V 10/255
348/622

(Continued)

FOREIGN PATENT DOCUMENTS

CN 106485670 A 3/2017
CN 107330870 A 11/2017
(Continued)

OTHER PUBLICATIONS

Chinese Office Action issued in corresponding CN Patent Application No. 202010092314.4, dated Mar. 16, 2023.
(Continued)

*Primary Examiner* — Yosef Kassa
(74) *Attorney, Agent, or Firm* — Carter, DeLuca & Farrell LLP

(57) ABSTRACT

An image processing apparatus comprises a first obtaining unit configured to obtain a range of a transmittance of air that is designated in accordance with a user operation to a captured image, and a generation unit configured to generate a corrected image in which influence of a microparticle component in the air on the captured image is suppressed based on the range.

19 Claims, 14 Drawing Sheets

(52) U.S. Cl.
CPC .............. *G06T 2200/24* (2013.01); *G06T 2207/20092* (2013.01); *G06T 2207/20221* (2013.01); *G06T 2207/30192* (2013.01)

(56) References Cited

U.S. PATENT DOCUMENTS

| | | | |
|---|---|---|---|
| 7,057,721 B2 | 6/2006 | Gardner, Jr. et al. | |
| 7,423,674 B2 | 9/2008 | Takeshita | |
| 8,063,992 B2 * | 11/2011 | Gutta | H05B 47/155 |
| | | | 348/739 |
| 8,289,372 B2 | 10/2012 | Hamrelius et al. | |
| 8,417,053 B2 | 4/2013 | Chen et al. | |
| 8,492,448 B2 * | 7/2013 | Dewa | C03C 13/045 |
| | | | 520/1 |
| 8,582,915 B2 | 11/2013 | Wen et al. | |
| 8,768,104 B2 | 7/2014 | Moses et al. | |
| 8,958,637 B2 | 2/2015 | Fukunaga | |
| 8,970,691 B2 * | 3/2015 | Omer | G06T 5/008 |
| | | | 345/589 |
| 9,091,637 B2 * | 7/2015 | Yu | G01L 9/0079 |
| 9,118,847 B2 | 8/2015 | Tani et al. | |
| 9,384,532 B2 | 7/2016 | Hong et al. | |
| 9,558,580 B2 | 1/2017 | Itoh | |
| 9,736,433 B2 * | 8/2017 | Tillotson | G01W 1/10 |
| 10,145,790 B2 | 12/2018 | Itoh | |
| 10,210,643 B2 * | 2/2019 | Itoh | G06T 7/90 |
| 10,217,240 B2 * | 2/2019 | Taylor | H04N 7/183 |
| 10,670,726 B2 * | 6/2020 | Suzuki | G01S 11/12 |
| 11,165,966 B2 | 11/2021 | Itoh | |
| 2011/0188775 A1 | 8/2011 | Sun et al. | |
| 2015/0287170 A1 | 10/2015 | Hoon | |
| 2016/0328832 A1 | 11/2016 | Jeon et al. | |
| 2018/0122051 A1 | 5/2018 | Li et al. | |
| 2020/0092454 A1 | 3/2020 | Itoh | |
| 2022/0021800 A1 | 1/2022 | Itoh | |

FOREIGN PATENT DOCUMENTS

| | | |
|---|---|---|
| JP | 2016-126750 A | 7/2016 |
| JP | 2017-037357 A | 2/2017 |

OTHER PUBLICATIONS

Notice of Reasons for Refusal issued by the Japanese Patent Office dated Nov. 7, 2022 in corresponding JP Patent Application No. 2019-026670, with English translation.

* cited by examiner

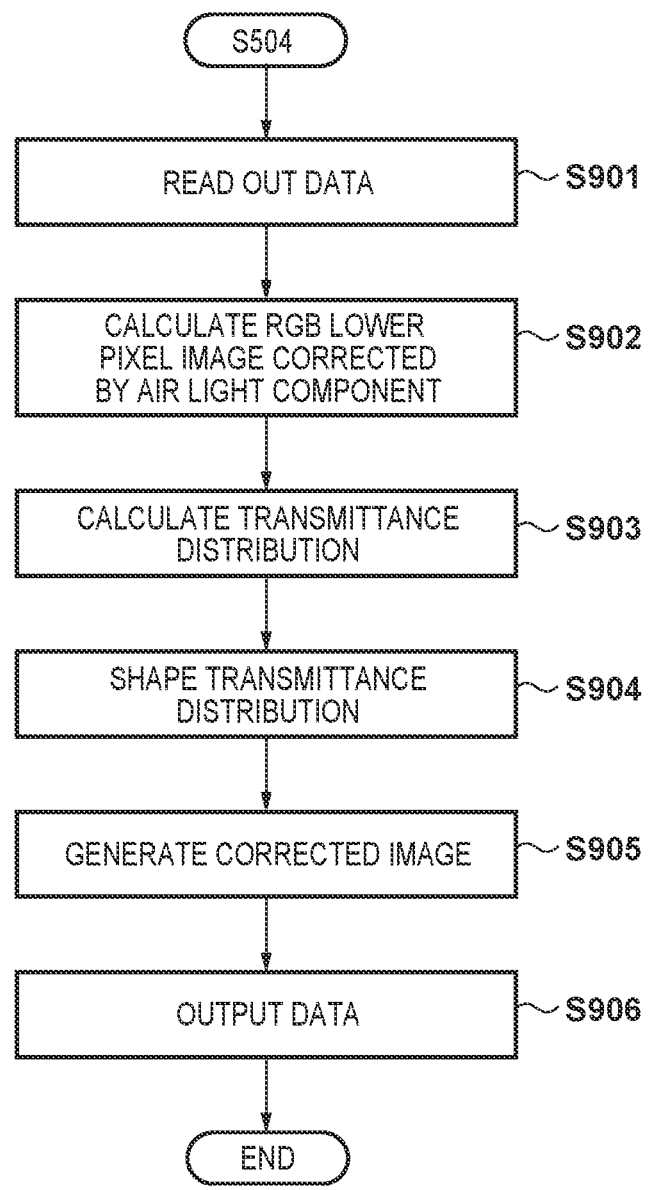

IMAGE PROCESSING APPARATUS, IMAGE PROCESSING METHOD, AND NON-TRANSITORY COMPUTER-READABLE STORAGE MEDIUM

CROSS REFERENCE TO RELATED APPLICATIONS

This application is a continuation of U.S. patent application Ser. No. 16/787,541, filed on Feb. 11, 2020, which claims the benefit of and priority to Japanese Patent Application No. 2019-026670, filed Feb. 18, 2019, each of which is hereby incorporated by reference herein in their entirety.

BACKGROUND OF THE INVENTION

Field of the Invention

The present invention relates to an image processing apparatus, an image processing method, and a non-transitory computer-readable storage medium, particularly to a technique for improving the quality of a captured image whose visibility drops due to the influence of a microparticle component in the air.

Description of the Related Art

In the field of monitoring cameras and the like, visibility drops owing to a microparticle component (for example, fog) present between a camera and an object, and the quality of a captured image becomes poor. US-2011-0188775 has been proposed as a technique (fog/haze removal technique) of correcting a captured image whose visibility drops due to a microparticle component such as fog. In US-2011-0188775, a minimum value within the RGB channel in a predetermined range around a pixel of interest is calculated for each pixel of interest, and the contrast is corrected using the minimum-value image to improve visibility. In US-2016-0328832, a parameter for fog/haze removal is determined based on a histogram in an input video.

In the technique described in US-2011-0188775, a parameter when performing image processing is held uniquely for an entire image. However, it is sometimes preferable to change the parameter between a case in which the fog/haze removal technique is applied to an object at a relatively short distance and a case in which the technique is applied to an object at a long distance. If processing is performed with a parameter aimed at an object at a long distance, the effect may become too strong for an object at a short distance and the image may become unnatural. In the technique described in US-2016-0328832, a parameter is determined based on a histogram in an entire image, so the parameter cannot be determined in accordance with user's designation.

SUMMARY OF THE INVENTION

It is an object of the present invention to provide a technique capable of adjusting a range in which the influence of a microparticle component in the air is suppressed in a captured image containing the influence, and adjusting the strength of the effect.

According to the first aspect of the present invention, there is provided an image processing apparatus comprising: a first obtaining unit configured to obtain a range of a transmittance of air that is designated in accordance with a user operation to a captured image; and a generation unit configured to generate a corrected image in which influence of a microparticle component in the air on the captured image is suppressed based on the range.

According to the second aspect of the present invention, there is provided an image processing method comprising: obtaining a range of a transmittance of air that is designated in accordance with a user operation to a captured image; and generating a corrected image in which influence of a microparticle component in the air on the captured image is suppressed based on the range.

According to the third aspect of the present invention, there is provided a non-transitory computer-readable storage medium storing a computer program for causing a computer to function as: a first obtaining unit configured to obtain a range of a transmittance of air that is designated in accordance with a user operation to a captured image; and a generation unit configured to generate a corrected image in which influence of a microparticle component in the air on the captured image is suppressed based on the range.

Further features of the present invention will become apparent from the following description of exemplary embodiments (with reference to the attached drawings).

BRIEF DESCRIPTION OF THE DRAWINGS

FIG. 9 is a flowchart showing details of processing in step S504;

FIGS. 10A to 10D are views showing details of filter processing;

DESCRIPTION OF THE EMBODIMENTS

Figure 1:
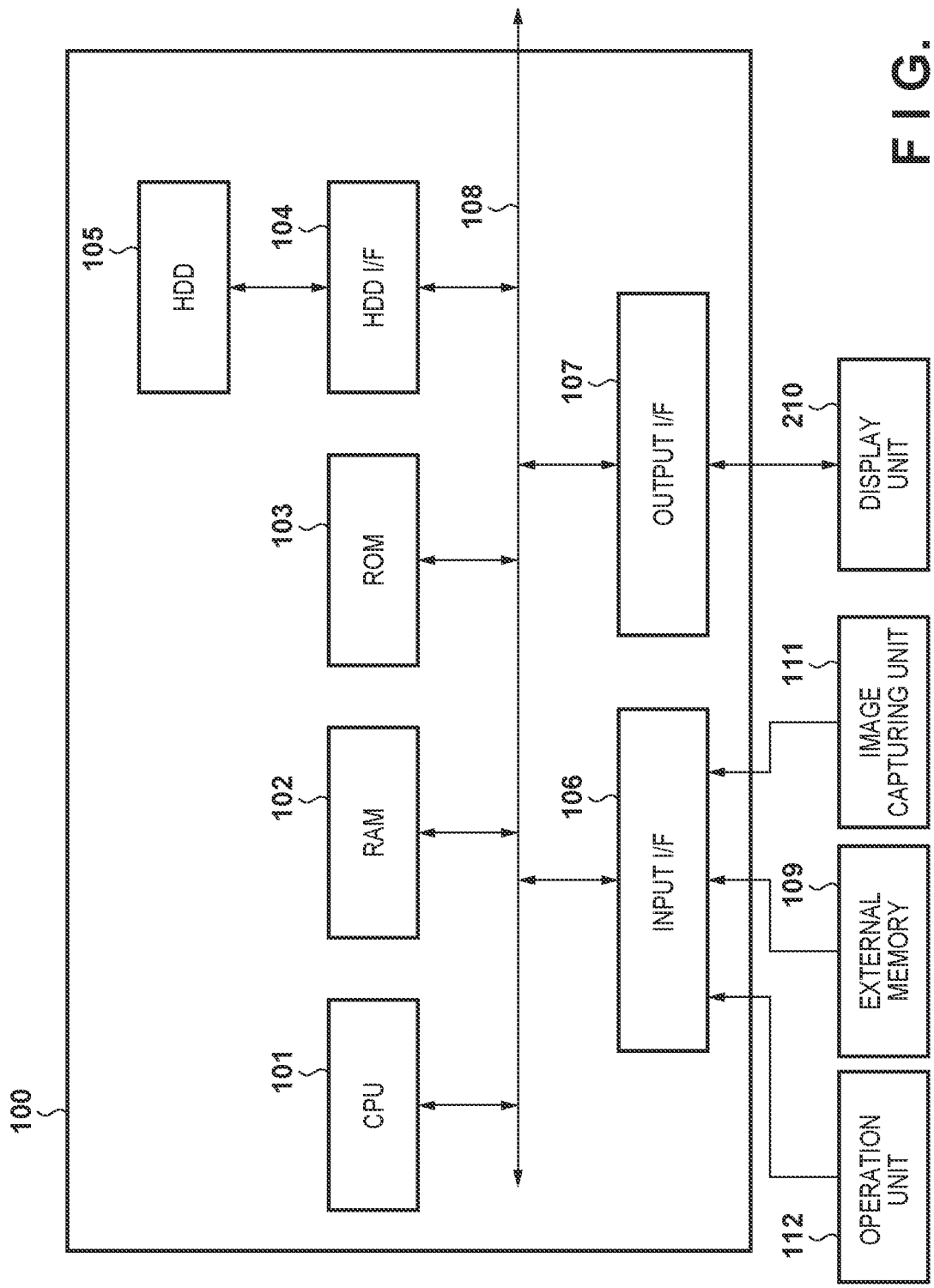
FIG. 1 is a block diagram showing an example of the hardware arrangement of an image processing apparatus.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached draw-

First Embodiment

General Description of First Embodiment

First, the first embodiment will be generally described. In this embodiment, the contract is low in a captured image (captured image containing the influence of a microparticle component in the air) of a scene in which a large amount of microparticle component such as fog is generated as compared to a case in which the microparticle component is not generated much. This is because, when light passes through the air, it is scattered by the microparticle component. Two types of light scattering are known. One is Mie scattering that is caused by large particles compared to the wavelength of light, such as particles of dirt, dust, or water vapor. Mie scattering occurs independently of the wavelength of light. When Mie scattering occurs, the contrast drops for a far object and the object looks white. The other is Rayleigh scattering that is caused by small particles compared to the wavelength of light, such as air molecules. In Rayleigh scattering, light of a shorter wavelength is scattered much more.

In this embodiment, removal processing is executed to suppress the influence of a microparticle component in the air on a captured image. This removal processing is called fog/haze removal, haze removal, or the like. In this embodiment, a distance range in which the influence of a microparticle component is suppressed in a scene is set in accordance with a user operation. Based on the set distance range, a Mie scattering component and a Rayleigh scattering component are estimated as microparticle components of a captured image. The estimated Mie scattering component and Rayleigh scattering component are suppressed individually and recomposed, obtaining a captured image in which the influence of the microparticle component is suppressed.

More specifically, an air light component, which is a light component scattered by the air, is estimated for a captured image (image whose contrast is decreased by scattered light). In this embodiment, a captured image is assumed to be an RGB image (captured image having the R, G, and B planes) in which the pixel value of each pixel includes three pixel values of the R, G, and B components. Then, a set (RGB lower pixel value image) of lower pixel values in an image region centered on a pixel of interest, and a set (lower pixel value image) of lower pixel values in an entire plane are obtained for the plane of each color of the captured image. The two types of scattering components, that is, the Mie scattering component and the Rayleigh scattering component are estimated using the results of changing values of the lower pixel value image and RGB lower pixel value image except a pixel value range equivalent to the distance range. Finally, these scattering components are composed.

<Example of Arrangement of Image Processing Apparatus>

Next, an example of the hardware arrangement of an image processing apparatus according to this embodiment will be described with reference to the block diagram of FIG. 1. As shown in FIG. 1, an image processing apparatus 100 according to this embodiment includes a CPU 101, a RAM 102, a ROM 103, an HDD (Hard Disk Drive) I/F (InterFace) 104, an HDD 105, an input I/F 106, an output I/F 107, and a system bus 108.

The CPU 101 executes various processes using computer programs and data stored in the RAM 102 and the ROM 103. By these processes, the CPU 101 controls the operation of the overall image processing apparatus 100, and executes or controls each processing that is performed by the image processing apparatus 100 in the following description.

The RAM 102 has an area for storing computer programs and data loaded from the ROM 103 and the HDD 105, and data received from an external memory 109 and an image capturing unit 111 via the input I/F 106. Further, the RAM 102 has a work area used when the CPU 101 executes various processes. In this manner, the RAM 102 can provide various areas appropriately. The ROM 103 stores setting data, startup programs, and the like for the image processing apparatus 100.

The HDD I/F 104 is an interface such as serial ATA (SATA) and is used to connect the HDD 105 serving as a secondary storage device to the system bus 108. The CPU 101 reads/writes information from/in the HDD 105 via the HDD I/F 104.

The HDD 105 is an example of a large-capacity information storage device. The HDD 105 saves an OS (Operating System), and computer programs and data for causing the CPU 101 to execute or control each processing that is performed by the image processing apparatus 100 in the following description.

The data saved in the HDD 105 includes information treated by the image processing apparatus 100 as known information in the following description. The computer programs and data saved in the HDD 105 are properly loaded to the RAM 102 via the HDD I/F 104 under the control of the CPU 101, and processed by the CPU 101. Note that the secondary storage device is not limited to the HDD 105 and may be a storage device such as an optical disk drive.

The input I/F 106 is a serial bus interface such as USB or IEEE1394. The image processing apparatus 100 is connected to an operation unit 112, the external memory 109, and the image capturing unit 111 via the input I/F 106.

The operation unit 112 includes user interfaces such as a keyboard, a mouse, and a touch panel screen. The user can operate the operation unit 112 to input various instructions to the CPU 101 via the input I/F 106.

The external memory 109 is a storage medium such as a hard disk drive, a memory card, a CF card, an SD card, or a USB memory and can save data processed by the image processing apparatus 100. The CPU 101 can read/write information from/in the external memory 109 via the input I/F 106.

The image capturing unit 111 captures a moving image or a still image, and outputs an image of each frame of the moving image or the still image as a captured image. The CPU 101 obtains, via the input I/F 106, the captured image output from the image capturing unit 111, and stores the obtained captured image in the RAM 102 or the HDD 105.

The output I/F 107 is a video output interface such as DVI or HDMI. The image processing apparatus 100 is connected to a display unit 210 via the output I/F 107. The display unit 210 has a liquid crystal screen, a touch panel screen, or the like, and can display the result of processing by the CPU 101 as an image, characters, or the like.

The system bus 108 is a transfer path for various data. All the CPU 101, the RAM 102, the ROM 103, the HDD I/F 104, the input I/F 106, and the output I/F 107 are connected to each other via the system bus 108.

Note that the arrangement of the image processing apparatus according to this embodiment is not limited to one shown in FIG. 1. For example, the image capturing unit 111 and the image processing apparatus 100 may be integrated. In this case, the image processing apparatus 100 integrated with the image capturing unit 111 serves as a computer apparatus having an image capturing function such as a camera-equipped smartphone or a digital camera.

Figure 2:
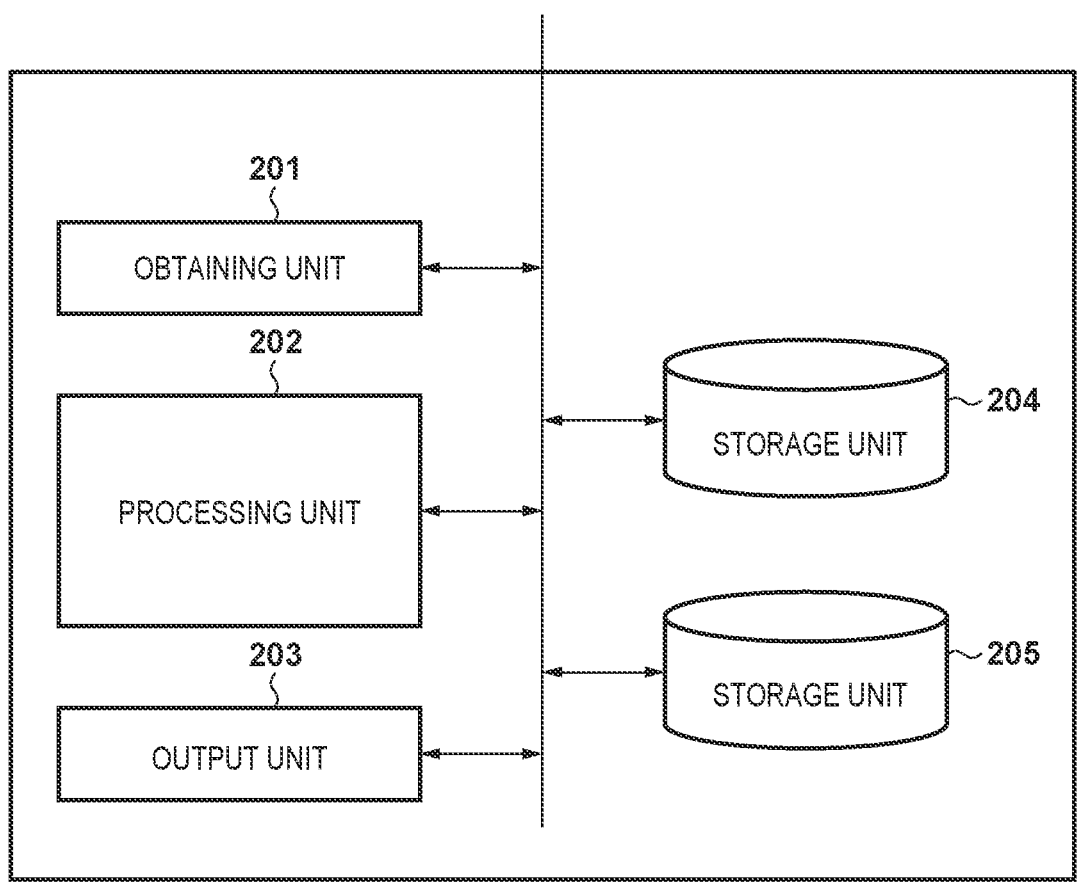
FIG. 2 is a block diagram showing an example of the functional arrangement of an image processing apparatus 100.
Figure 3:
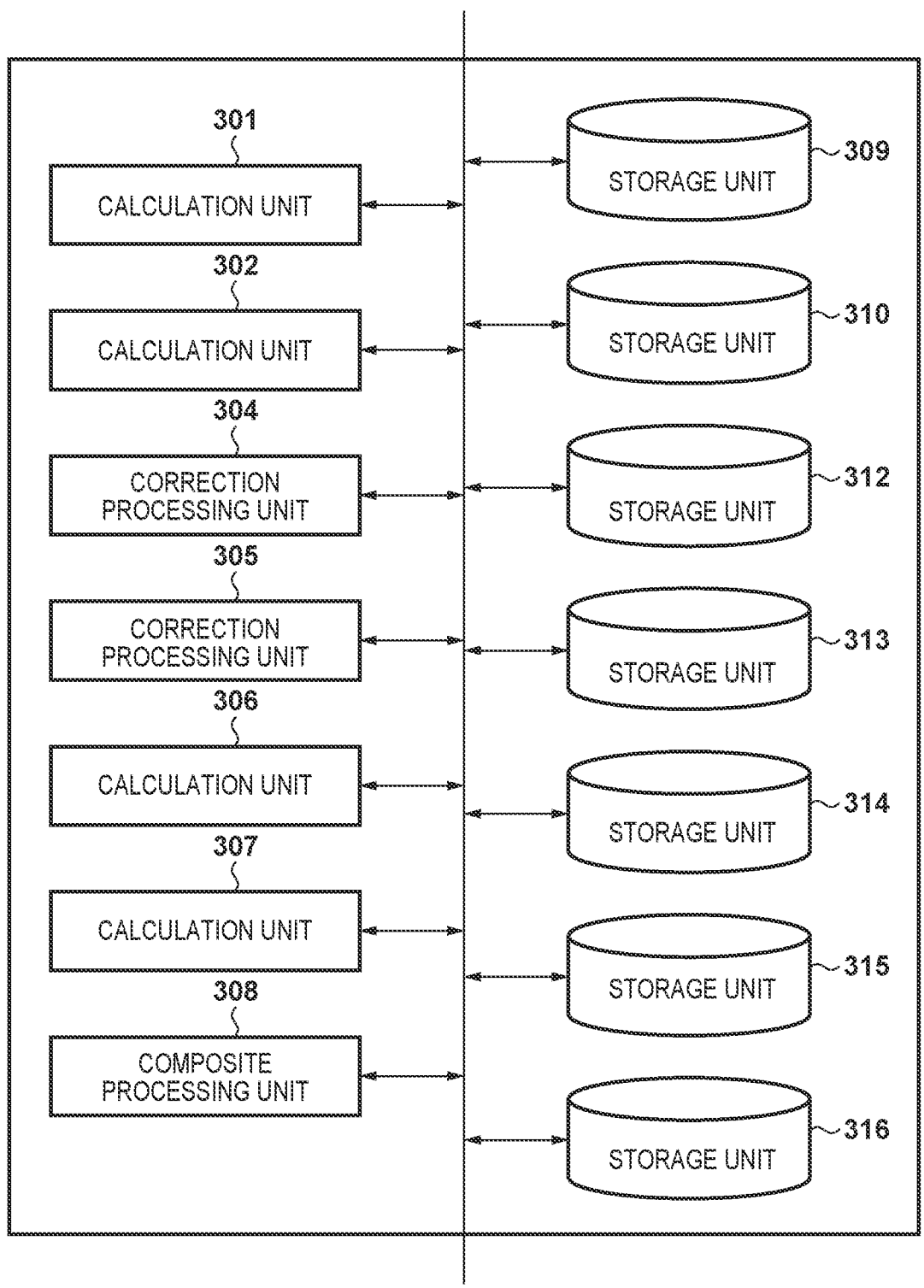
FIG. 3 is a block diagram showing an example of the functional arrangement of a processing unit 202.

FIG. 2 is a block diagram showing an example of the functional arrangement of the image processing apparatus 100. FIG. 3 is a block diagram showing an example of the functional arrangement of a processing unit 202 in FIG. 2. Function units (execution function units) except function units called storage units will be described as the main constituent of processing. In practice, however, the functions of the execution function units are implemented by executing by the CPU 101 computer programs for causing the CPU 101 to implement the functions of the execution function units. The function units called storage units in FIGS. 2 and 3 can be implemented by memory devices such as the RAM 102, the ROM 103, the HDD 105, and the external memory 109. Note that the function units shown in FIGS. 2 and 3 may be implemented by hardware.

<Overall Processing of Image Processing Apparatus 100>

Figure 4:
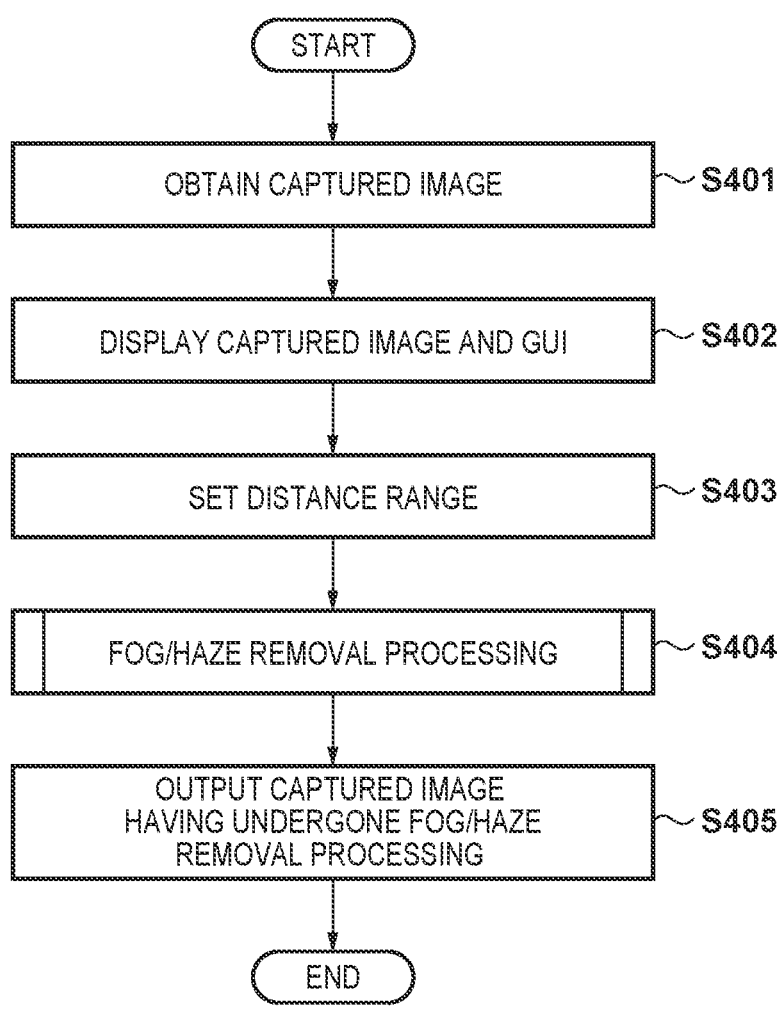
FIG. 4 is a flowchart of overall processing of the image processing apparatus 100.

Processing performed by the image processing apparatus 100 to generate and output a captured image in which "the influence of a microparticle component in the air" in a captured image is suppressed will be described with reference to the flowchart of FIG. 4.

In step S401, an obtaining unit 201 obtains a captured image sent from the image capturing unit 111 and stores the obtained captured image in a storage unit 204. Note that the obtaining source of a captured image is not limited to a specific obtaining source.

In step S402, the processing unit 202 causes the display unit 110 to display the captured image obtained in step S401 and a GUI (Graphical User Interface) for designating a distance range in which the influence of a microparticle component is suppressed.

Figure 13:
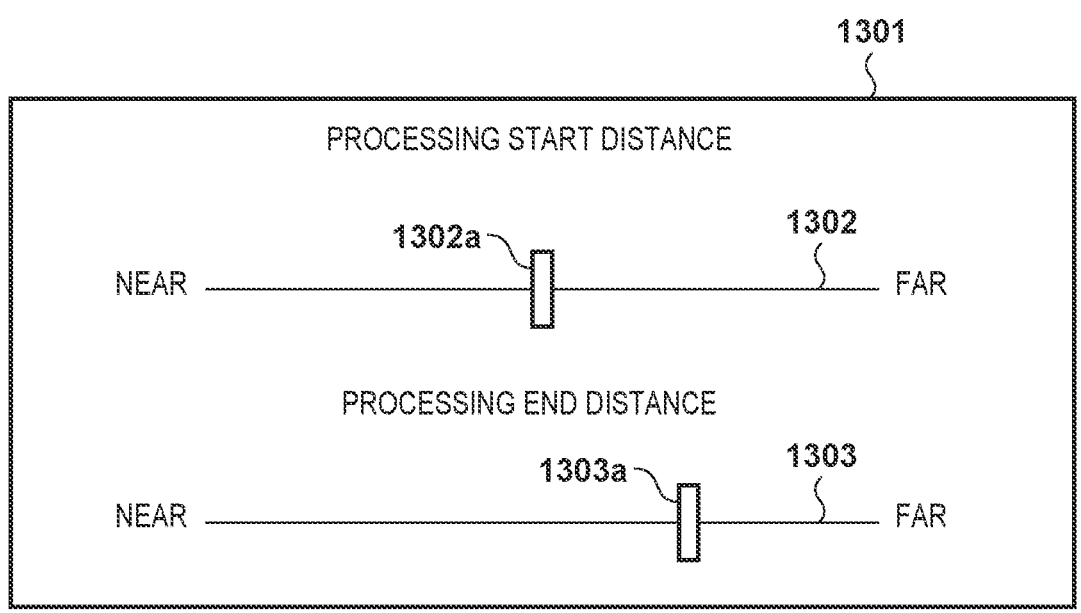
FIG. 13 is a view showing an example of the display of a GUI.

FIG. 13 shows an example of the display of the GUI. A GUI 1301 includes a slider bar 1302 for designating one end (processing start distance) of the distance range in which the influence of a microparticle component is suppressed, and a slider bar 1303 for designating the other end (processing end distance).

It is known that the processing start distance and the processing end distance are almost inversely proportional to the transmittance distribution. That is, the transmittance becomes lower as the distance becomes longer, and higher as the distance becomes shorter. Hence, a shortest distance (transmittance upper limit t_th_max) in the distance range in which the influence of a microparticle component is suppressed is designated as the processing start distance. A longest distance (transmittance lower limit t_th_min) in the distance range in which the influence of a microparticle component is suppressed is designated as the processing end distance.

A slider 1302a is positioned on the slider bar 1302. The user can operate the operation unit 112 to move the slider 1302a right and left on the slider bar 1302. As the slider 1302a is closer to the left end of the slider bar 1302, a smaller value is set as t_th_max, and as it is closer to the right end, a larger value is set as t_th_max.

A slider 1303a is positioned on the slider bar 1303. The user can operate the operation unit 112 to move the slider 1303a right and left on the slider bar 1303. As the slider 1303a is closer to the left end of the slider bar 1303, a smaller value is set as t_th_min, and as it is closer to the right end, a larger value is set as t_th_min.

In step S403, the processing unit 202 accepts input of operations in which the user operates the operation unit 112 to move the sliders 1302a and 1303a right and left. Assume that the user operates the operation unit 112 and inputs an instruction to complete the setting of t_th_max and t_th_min. In accordance with this input, the processing unit 202 stores, in a storage unit 316, t_th_max corresponding to the current position of the slider 1302a and t_th_min corresponding to the current position of the slider 1303a.

Note that the method for setting one end and the other end of the distance range in which the influence of a microparticle component is suppressed is not limited to a specific method. For example, the arrangement of the GUI is not limited to the arrangement shown in FIG. 13, and the GUI may allow directly inputting respective values of t_th_max and t_th_min. Alternatively, for example, one end and the other end of the distance range may be set by a voice input.

In step S404, the processing unit 202 performs fog/haze removal processing as processing for suppressing the influence of a microparticle component on the captured image stored in the storage unit 204 in step S401. The processing unit 202 then stores the captured image having undergone fog/haze removal processing in a storage unit 205. Details of the processing in step S404 will be described later.

In step S405, an output unit 203 outputs the captured image stored in the storage unit 205 in step S404 to the HDD 105 via the HDD I/F 104, and the captured image is saved in the HDD 105. Note that the output destination of a captured image having undergone fog/haze removal processing is not limited to the HDD 105.

<Fog/Haze Removal Processing: Step S404>

Figure 5:
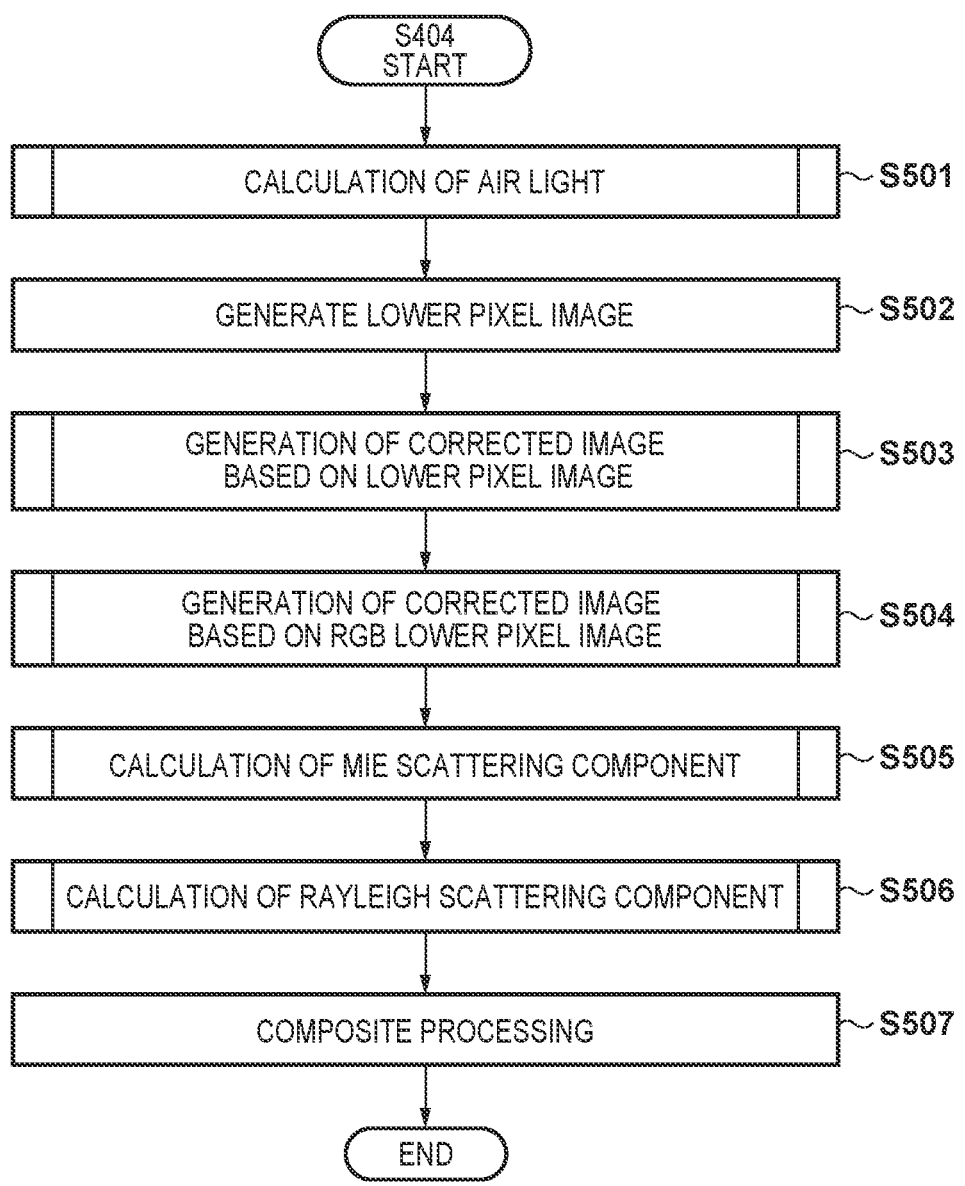
FIG. 5 is a flowchart showing details of processing in step S404.

Details of the fog/haze removal processing in step S404 will be explained with reference to the flowchart of FIG. 5. Note that the fog/haze removal processing can be regarded as processing for removing the influence of a microparticle component or processing for suppressing the influence of a microparticle component.

In step S501, a calculation unit 301 estimates an air light component, which is a light component scattered by the air, based on a captured image stored in the storage unit 204. The calculation unit 301 stores the estimated air light component in a storage unit 309. Details of the processing in step S501 will be described later.

In step S502, a calculation unit 302 generates a lower pixel image from the captured image stored in the storage unit 204, and stores the generated lower pixel image in a storage unit 310. Details of the processing in step S502 will be described later.

In step S503, a correction processing unit 304 obtains, as first correction information, the air light component stored in the storage unit 309, the lower pixel image stored in the storage unit 310, and t_th_max and t_th_min stored in the storage unit 316. The correction processing unit 304 generates a corrected image (corrected image based on the lower pixel image) by correcting the captured image stored in the storage unit 204 using the first correction information. The correction processing unit 304 then stores the generated corrected image in a storage unit 312. Details of the processing in step S503 will be described later.

In step S504, a correction processing unit 305 obtains, as second correction information, the captured image stored in the storage unit 204, the air light component stored in the storage unit 309, and t_th_max and t_th_min stored in the storage unit 316. The correction processing unit 305 generates a corrected image (corrected image based on the RGB lower pixel image) by correcting the captured image stored in the storage unit 204 using the second correction information. The correction processing unit 305 stores the generated corrected image in a storage unit 313. Details of the processing in step S504 will be described later.

In step S505, a calculation unit 306 generates a Mie scattering component image equivalent to the Mie scattering component of the captured image stored in the storage unit 204 by using the captured image stored in the storage unit 204 and the corrected image stored in the storage unit 312. The calculation unit 306 stores the generated Mie scattering component image in a storage unit 314. Details of the processing in step S505 will be described later.

In step S506, a calculation unit 307 generates a Rayleigh scattering component image equivalent to the Rayleigh scattering component of the captured image by using the captured image stored in the storage unit 204, the corrected image stored in the storage unit 313, and the Mie scattering component image stored in the storage unit 314. The calculation unit 307 stores the generated Rayleigh scattering component image in a storage unit 315. Details of the processing in step S506 will be described later.

In step S507, a composite processing unit 308 generates a composite image by performing image composition using the corrected image stored in the storage unit 313, the Mie scattering component image stored in the storage unit 314, and the Rayleigh scattering component image stored in the storage unit 315. The composite processing unit 308 stores the generated composite image as a captured image having undergone removal processing in the storage unit 205.

<Estimation of Air Light Component: Step S501>

Figure 7:
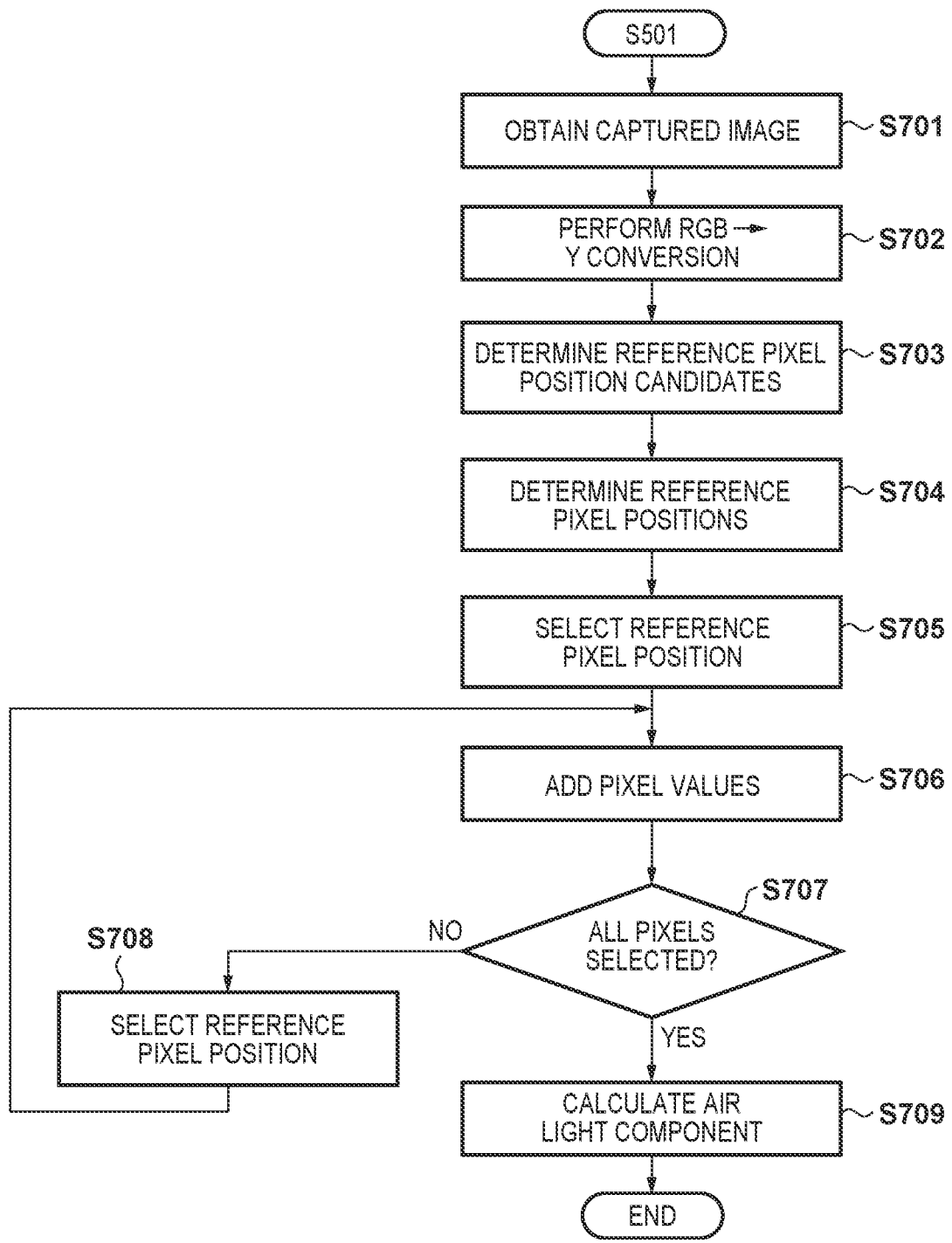
FIG. 7 is a flowchart showing details of processing in step S501.

Details of the air light component estimation processing in step S501 will be described with reference to the flowchart of FIG. 7. In the air light component estimation processing, a maximum luminance value in the luminance image (Y image) of a captured image (RGB image) is specified, and the positions of pixels each having a luminance value equal to or larger than 99% of the maximum luminance value are specified as reference pixel position candidates. Pixel positions (reference pixel positions) to be referred to estimate air light are determined by robust estimation processing from reference pixel position candidates. An air light component is estimated based on the pixel value of the reference pixel position in the captured image.

In step S701, the calculation unit 301 obtains a captured image stored in the storage unit 204. In step S702, the calculation unit 301 converts the captured image obtained in step S701 into a luminance image. This conversion adopts, for example, a general RGB-Y color conversion equation.

In step S703, the calculation unit 301 specifies a maximum luminance value in the luminance image obtained by the conversion in step S702. The calculation unit 301 then specifies, as reference pixel position candidates, the positions of pixels each having a luminance value equal to or larger than a specified ratio (99% in this embodiment) of the maximum luminance value. Although "the positions of pixels each having a luminance value equal to or larger than 99% of the maximum luminance value" are specified as reference pixel position candidates in this embodiment, a numerical value other than "99%" may be used.

In step S704, the calculation unit 301 determines, using robust estimation such as RANSAC, reference pixel positions to be referred to estimate an air light component from the reference pixel position candidates specified in step S703. This is because a pixel position to be selected as air light is desirably the pixel position of a sky portion in the first place, and a high-luminance portion other than the sky in an image is desirably excluded from candidates of pixel positions to be selected. In general, the ratio of a high-luminance portion other than the sky to an image is low, and the high-luminance portion is prone to differ in luminance from the sky color. Thus, robust estimation is performed to treat the high-luminance portion as an outlier and exclude it. At this time, the number of pixel positions can also be restricted to avoid a situation in which when the sky color gradates in the image, even the single sky has different pixel values, and if too many pixels are referred to, even a color-changed sky portion is subjected to estimation.

In step S705, the calculation unit 301 selects one of the reference pixel positions determined in step S704 as a selected reference pixel position. In step S705, for example, a reference pixel position closest to the upper left corner of the captured image/luminance image is selected as a selected reference pixel position from the reference pixel positions determined in step S704. The calculation unit 301 initializes, to 0, variables SR, SG, and SB used later.

In step S706, the calculation unit 301 obtains the pixel values R, G, and B of the selected reference pixel position in the captured image, and calculates SR=SR+R, SG=SG+G, and SB=SB+B. SR is the sum of pixel values of the R component at reference pixel positions selected as selected reference pixel positions so far. SG is the sum of pixel values of the G component at reference pixel positions selected as selected reference pixel positions so far. SB is the sum of pixel values of the B component at reference pixel positions selected as selected reference pixel positions so far.

In step S707, the calculation unit 301 determines whether all the reference pixel positions determined in step S704 have been selected as selected reference pixel positions. If the calculation unit 301 determines that all the reference pixel positions determined in step S704 have been selected as selected reference pixel positions, the process advances to step S709. If the calculation unit 301 determines that reference pixel positions not selected as selected reference pixel positions are left among the reference pixel positions determined in step S704, the process advances to step S708.

In step S708, the calculation unit 301 selects one of the unselected reference pixel positions as a selected reference pixel position from the reference pixel positions determined in step S704. For example, in step S708, the calculation unit 301 selects, as a selected reference pixel position, a reference pixel position adjacent on the right to a previously selected reference pixel position. If there is no reference pixel position adjacent on the right to a previously selected reference pixel position, the calculation unit 301 selects, as a selected reference pixel position, a reference pixel position that is at the top of reference pixel positions located in the down direction of the image from the previously selected reference pixel position and is closest to the left end. After that, the process advances to step S706.

In step S709, the calculation unit 301 calculates an air light component $A_{RGB}$ and an air light component value $A_Y$ of the lower pixel image using SR, SG and SB obtained in the above-described processing according to equations (1) and (2):

$$A_{RGB}=(SR/n, SG/n, SB/n) \quad (1)$$

$$A_Y=(SR/n+SG/n+SB/n)/3 \quad (2)$$

where n is the total number of reference pixel positions determined in step S704. Note that equations (1) and (2) are merely examples, and the air light component $A_{RGB}$ and the air light component value $A_Y$ of the lower pixel image may be calculated using other equations. For example, a smallest value among SR/n, SG/n, and SB/n may be used as $A_Y$ instead of using equation (2).

The calculation unit 301 stores, in the storage unit 309, the air light component value $A_{RGB}$ calculated according to equation (1) and the air light component value $A_Y$ of the lower pixel image calculated according to equation (2).

<Generation of Lower Pixel Image: Step S502>

Figure 6:
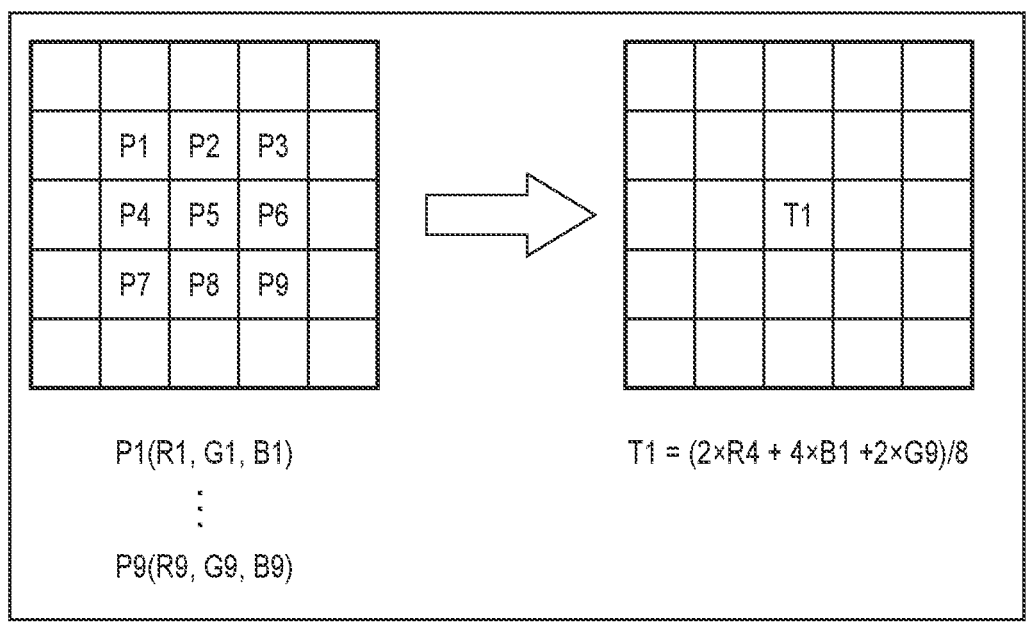
FIG. 6 is a view for explaining step S502.

Details of the lower pixel image generation processing in step S502 will be described by exemplifying FIG. 6. The left side of FIG. 6 is a view showing an image region constituted by a pixel P5 of interest in a captured image and eight pixels P1 to P4 and P6 to P9 surrounding the pixel P5 of interest. The pixel values of a pixel Pm (m=1 to 9) will be referred to as (Rm, Gm, Bm). Assume that the R, G, and B pixel values of the pixels P1 to P9 have a relation: R5>B3>R2> . . . >R4>B1>G9>G7.

The right side of FIG. 6 is a view showing a pixel T1 at a position corresponding to the pixel P5 of interest in a lower pixel image equal in size to the captured image (equal to the captured image in the numbers of pixels in the longitudinal and lateral directions), and pixels surrounding the pixel T1. At this time, a pixel value T1 of the pixel T1 is calculated by the weighted average of three lower pixel values R4, B1, and G9 except the lowest pixel value G7 among the R, G, and B pixel values of the pixels P1 to P9, as given by equation (3):

$$T1=(2\times R4+4\times B1+2\times G9)/8 \quad (3)$$

Since not a minimum value but a weighted average is adopted, strong influence of sensor noise on the lower pixel image can be suppressed. That is, generation of a pixel strongly influenced by sensor noise in a processed image can be suppressed as compared to a case in which a minimum value is adopted.

This processing can determine the pixel value of the pixel T1 in the lower pixel image that corresponds to the pixel P5 of interest in the captured image. Each pixel in the captured image is set as the pixel P5 of interest, and the above-described processing is performed. The pixel value of a pixel in the lower pixel image that corresponds to each pixel in the captured image can be determined, and the lower pixel image can therefore be generated.

Note that equation (3) is an example of the calculation equation for determining a pixel value in a lower pixel image, and a pixel value in a lower pixel image may be determined using another calculation equation. For example, the average value of four lower pixel values from the second lowest pixel value may be calculated as the pixel value T1. In this embodiment, eight pixels adjacent to the pixel of interest are used as pixels surrounding the pixel of interest, but the surrounding pixels are not limited to the eight pixels. For example, the surrounding pixels may be a total of 24 pixels including 16 pixels surrounding the eight pixels, or much more pixels may be used as surrounding pixels.

<Generation of Corrected Image Based on Lower Pixel Image: Step S503>

Figure 8:
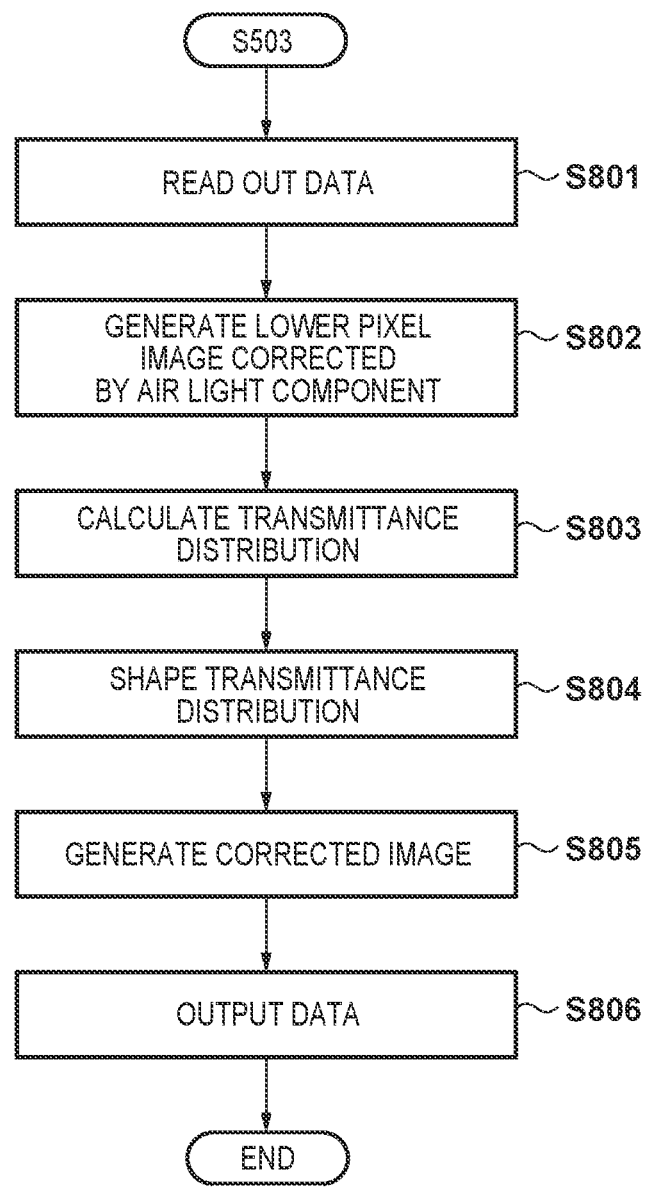
FIG. 8 is a flowchart showing details of processing in step S503.

Details of the processing in step S503 will be described with reference to the flowchart of FIG. 8. In step S801, the correction processing unit 304 obtains the air light component $A_Y$ stored in the storage unit 309, the lower pixel image stored in the storage unit 310, and t_th_max and t_th_min stored in the storage unit 316.

In step S802, the correction processing unit 304 generates a corrected lower pixel image by correcting the lower pixel image obtained in step S801 using the air light component $A_Y$ obtained in step S801. The lower pixel image is corrected using the air light component $A_Y$ according to, for example, equation (4):

$$\text{lower}\_A=T_{in\_lower}/A_Y \quad (4)$$

where $T_{in\_lower}$ is the lower pixel image obtained in step S801, and lower_A is the corrected lower pixel image generated by correcting the lower pixel image obtained in step S801 using the air light component $A_Y$ obtained in step S801. Equation (4) represents that an image obtained by dividing by $A_Y$ the pixel value of each pixel in the lower pixel image $T_{in\_lower}$ serves as the corrected lower pixel image lower_A.

In step S803, the correction processing unit 304 generates a transmittance distribution $t_{lower}$ from the corrected lower pixel image lower_A generated in step S802. Letting lower_A(x,y) be the pixel value at the pixel position (x,y) in the corrected lower pixel image lower_A, a value $t_{lower}(x,y)$ corresponding to the pixel position (x,y) in the transmittance distribution $t_{lower}$ is calculated according to equation (5):

$$t_{lower}(x,y)=1.0-\omega(\text{lower}\_A(x,y)) \quad (5)$$

where ω is the coefficient for adjustment and is, for example, 0.9. ω is a value set to avoid a situation in which when transmitted light of a target pixel is formed from only light scattered by a microparticle such as fog, the transmittance becomes 0 and a pixel value after microparticle removal processing becomes 0. ω may not be 0.9 described above. Values in the transmittance distribution $t_{lower}$ that correspond to all x and y values can be determined by performing the calculation of equation (5) for all x and y values.

In step S804, the correction processing unit 304 shapes (corrects) the transmittance distribution $t_{lower}$ obtained in step S803 by using the captured image stored in the storage unit 204, and t_th_max and t_th_min obtained in step S801.

This is because the transmittance distribution needs to conform to an object shape such as a structure included in the captured image, and the processing range is limited to a distance range defined by t_th_max and t_th_min. Also, this is because the transmittance distribution includes only rough object shape information in the captured image by the processing up to step S803, and the object shape needs to be separated precisely. More specifically, a known edge-preserving filter is used.

The processing for suppressing the influence of a microparticle is not performed on the region of pixels not included in the distance range defined by t_th_max and t_th_min. Of $t_{lower}(x,y)$ values corresponding to pixel positions (x,y) of the captured image, $t_{lower}(x,y)$ values that satisfy $t_{lower}(x,y)$>t_th_max or $t_{lower}(x,y)$<t_th_min are updated to "1" (value representing no transmission). That is, values corresponding to the outside of the distance range out of $t_{lower}(x,y)$ values corresponding to pixel positions (x,y) of the captured image are updated to "1".

In this embodiment, the transmittance distribution is corrected using t_th_max and t_th_min after filter processing. However, filter processing may be performed after the transmittance distribution is corrected using t_th_max and t_th_min.

In step S805, the correction processing unit 304 generates a corrected image by correcting the captured image stored in the storage unit 204 using the transmittance distribution $t_{lower}$ shaped in step S804 and the air light component $A_Y$ obtained in step S801. This correction is performed according to equation (6). That is, $J_{lower}(x,y)$ as the pixel value at the pixel position (x,y) in the corrected image $J_{lower}$ is given by:

$$J_{lower}(x,y)=(I(x,y)-A_Y)/\max(t0,t_{lower}(x,y))+A_Y \quad (6)$$

where I(x,y) is the pixel value at the pixel position (x,y) in a captured image I stored in the storage unit 204, max(A, B) is the function of outputting A if A>B and B if B<A, and t0 is the coefficient for adjustment and is, for example, 0.1. t0 is a value set to prevent a situation in which when $t_{lower}$ is an excessively small value, the $J_{lower}$ value greatly varies depending on a small difference of I, that is, shot noise at the time of image capturing or the like. t0 need not be 0.1 mentioned above.

In step S806, the correction processing unit 304 stores, in the storage unit 312, the corrected image $J_{lower}$ generated in step S805. This processing can create, based on the lower pixel image, an image in which the influence of a micropar- ticle component is corrected.

<Generation of Corrected Image Based on RGB Lower Pixel Image: Step S504>

Details of the processing in step S504 will be described with reference to the flowchart of FIG. 9. In step S901, the correction processing unit 305 obtains the captured image stored in the storage unit 204, the air light component $A_{RGB}$ stored in the storage unit 309, and t_th_max and t_th_min stored in the storage unit 316.

In step S902, the correction processing unit 305 corrects the respective R, G, and B planes of the captured image using the air light component $A_{RGB}$. This correction is performed according to equation (7). That is, RGB_A(x,y,c) as the pixel value at the pixel position (x,y) in the c plane in the RGB lower pixel image RGB_A is given by:

$$RGB\_A(x,y,c) = T_{in\_RGB}(x,y,c)/A_{RGB} \quad (7)$$

where $T_{in\_RGB}(x,y,c)$ is the pixel value at the pixel position (x,y) in the c (c=R, G, B) plane in the captured image.

The correction processing unit 305 generates an RGB lower pixel value image patch_RGB_A by performing filter processing on the RGB lower pixel image RGB_A. Details of the filter processing performed on the RGB lower pixel image RGB_A will be described with reference to FIGS. 10A to 10D.

Figures 10A, 10B, 10C, 10D:
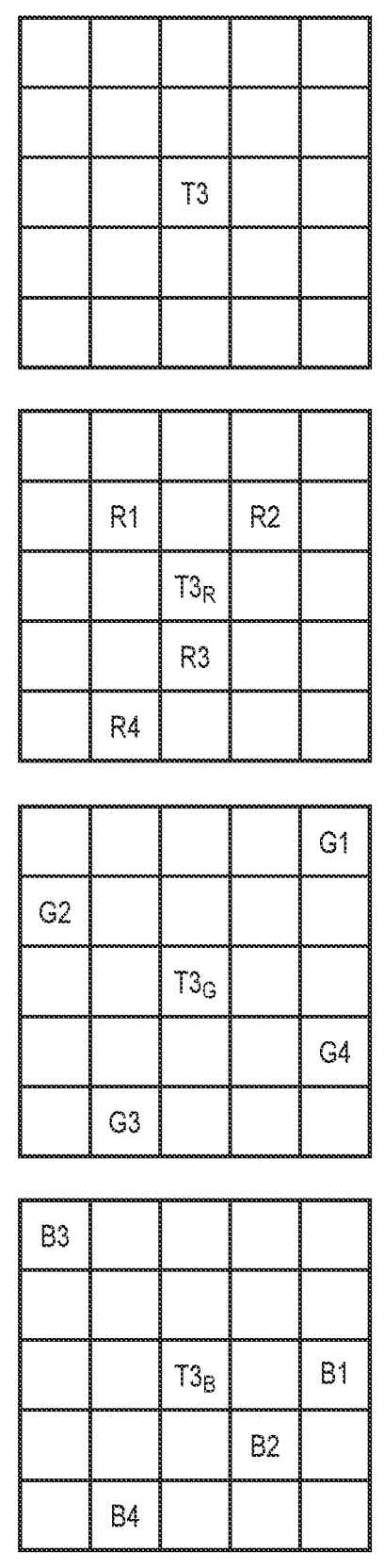

FIG. 10A shows a pixel T3 of interest in the RGB lower pixel value image patch_RGB_A and its surrounding pixels. Filter processing for determining a pixel value T3 of the pixel T3 of interest will be explained below. The filter processing to be described later is performed on each pixel in the RGB lower pixel value image patch_RGB_A to determine the pixel value of each pixel of the RGB lower pixel value image patch_RGB_A. FIGS. 10B to 10D show the R, G, and B planes of the RGB lower pixel image RGB_A, respectively.

In FIG. 10B, $T3_R$ represents a pixel corresponding to the pixel T3 of interest in the R plane of the RGB lower pixel image RGB_A. Among 25 pixels belonging to an image region of 5 pixels×5 pixels centered on the pixel $T3_R$, R1 to R4 are a pixel of a smallest pixel value, a pixel of a second smallest pixel value, a pixel of a third smallest pixel value, and a pixel of a fourth smallest pixel value, respectively. That is, R4>R3>R2>R1 is satisfied.

In FIG. 10C, $T3_G$ represents a pixel corresponding to the pixel T3 of interest in the G plane of the RGB lower pixel image RGB_A. Among 25 pixels belonging to an image region of 5 pixels×5 pixels centered on the pixel $T3_G$, G1 to G4 are a pixel of a smallest pixel value, a pixel of a second smallest pixel value, a pixel of a third smallest pixel value, and a pixel of a fourth smallest pixel value, respectively. That is, G4>G3>G2>G1 is satisfied.

In FIG. 10D, T3B represents a pixel corresponding to the pixel T3 of interest in the B plane of the RGB lower pixel image RGB_A. Among 25 pixels belonging to an image region of 5 pixels×5 pixels centered on the pixel T3B, B1 to B4 are a pixel of a smallest pixel value, a pixel of a second smallest pixel value, a pixel of a third smallest pixel value, and a pixel of a fourth smallest pixel value, respectively. That is, B4>B3>B2>B1 is satisfied.

In this case, a pixel value TR of the R component of the pixel T3, a pixel value TG of the G component of the pixel T3, and a pixel value TB of the B component of the pixel T3 are calculated according to equations (8A) to (8C):

$$TR = (2 \times R2 + 4 \times R3 + 2 \times R4)/8 \quad (8A)$$

$$TG = (2 \times G2 + 4 \times G3 + 2 \times G4)/8 \quad (8B)$$

$$TB = (2 \times B2 + 4 \times B3 + 2 \times B4)/8 \quad (8C)$$

Each of TR, TG, and TB is calculated using pixel values only within a corresponding color plane, unlike a lower pixel image. For the lower pixel image, pixels of all the planes around a pixel of interest are targeted, unlike the RGB lower pixel image, and pixels to be employed are highly likely to be employed from pixels of all the R, G, and B planes. For the RGB lower pixel image, pixels are employed from only each color plane. This difference makes it possible to consider the influence of the wavelength of scattering of light.

Referring back to FIG. 9, in step S903, the correction processing unit 305 generates a transmittance distribution $t_{RGB}$ from the RGB lower pixel value image patch_RGB_A generated in step S902. Let patch_RGB_A(x,y,c) be the pixel value at the pixel position (x,y) in the c plane of the RGB lower pixel value image patch_RGB_A. Then, a value $t_{RGB}(x,y,c)$ corresponding to the pixel value (x,y) in the c plane in the transmittance distribution $t_{RGB}$ is calculated according to equation (9):

$$t_{RGB}(x,y,c) = 1.0 - \omega(\text{patch\_RGB\_A}(x,y,c)) \quad (9)$$

Values in the transmittance distribution $t_{RGB}$ that correspond to all x, y, and c can be determined by performing the calculation of equation (9) for all x, y, and c. In step S904, the correction processing unit 305 shapes (corrects) the transmittance distribution $t_{RGB}$ for each color plane by applying processing similar to step S804 to each color plane of the transmittance distribution $t_{RGB}$.

In step S905, the correction processing unit 305 generates a corrected image by correcting the captured image stored in the storage unit 204 using the transmittance distribution $t_{RGB}$ shaped in step S904 and the air light component $A_{RGB}$ obtained in step S901. This correction is performed according to equation (10). That is, $J_{RGB}(x,y,c)$ as the pixel value at the pixel position (x,y) in the c plane of the corrected image $J_{RGB}$ is given by:

$$J_{RGB}(x,y,c) = (I(x,y,c) - A_{RGB})/\max(t0, t_{RGB}(x,y,c)) + A_{RGB} \quad (10)$$

where I(x,y,c) is the pixel value at the pixel position (x,y) in the c plane of the captured image I stored in the storage unit 204, and t0 is the coefficient for adjustment and is, for example, 0.1. t0 is a value set to prevent a situation in which when $t_{RGB}$ is an excessively small value, the $J_{RGB}$ value greatly varies depending on a small difference of I, that is, shot noise at the time of image capturing or the like. t0 need not be 0.1 mentioned above.

In step S906, the correction processing unit 305 stores the corrected image $J_{RGB}$ generated in step S905 in the storage unit 313. This processing can create, based on by the RGB lower pixel image, an image in which the influence of a microparticle component is corrected.

<Calculation of Mie Scattering Component: Step S505>

Figure 11:
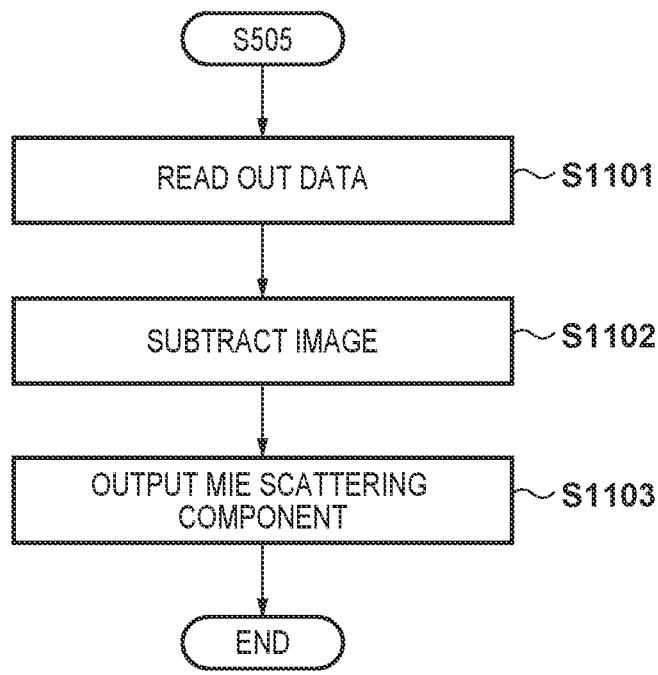
FIG. 11 is a flowchart showing details of processing in step S505.

Details of the processing in step S505 will be described with reference to the flowchart of FIG. 11. In step S1101, the calculation unit 306 obtains the captured image stored in the storage unit 204 and the corrected image stored in the storage unit 312. In step S1102, the calculation unit 306 generates a Mie scattering component image M equivalent to the Mie scattering component of the captured image I by performing arithmetic processing given by equation (11) using the captured image I and corrected image $J_{lower}$ obtained in step S1101:

If $I(x,y,c)-J_{lower}(x,y,c) \geq 0, M(x,y,c) = I(x,y,c) - J_{lower}(x,y,c)$

If $I(x,y,c)-J_{lower}(x,y,c) < 0, M(x,y,c) = 0$ (11)

wherein M(x,y,c) is the pixel value at the pixel position (x,y) in the c plane of the Mie scattering component image M. Values (pixel values) corresponding to all x, y, and c in the Mie scattering component image M are determined by performing arithmetic processing according to equation (11) for all x, y, and c. In step S1103, the calculation unit 306 stores in the storage unit 314 the Mie scattering component image M generated in step S1102.

<Calculation of Rayleigh Scattering Component: Step S506>

Figure 12:
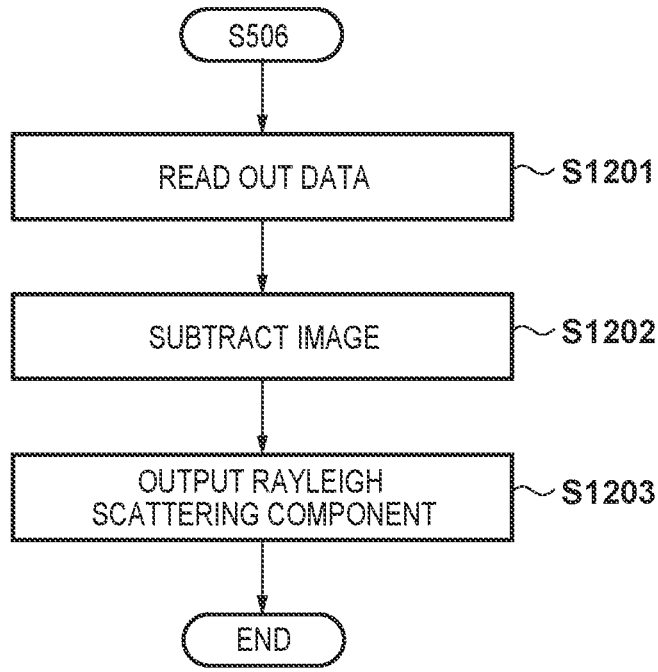
FIG. 12 is a flowchart showing details of processing in step S506.

Details of the processing in step S506 will be described with reference to the flowchart of FIG. 12. In step S1201, the calculation unit 307 obtains the captured image stored in the storage unit 204, the corrected image stored in the storage unit 313, and the Mie scattering component image stored in the storage unit 314.

In step S1202, the calculation unit 307 generates a Rayleigh scattering component image R equivalent to the Rayleigh scattering component of the captured image I by performing arithmetic processing given by equation (12) using the captured image I, corrected image $J_{RGB}$, and Mie scattering component image M obtained in step S1201:

If $I(x,y,c)-J_{RGB}(x,y,c)-M(x,y,c) \geq 0, R(x,y,c) = I(x,y,c) - J_{RGB}(x,y,c) - M(x,y,c)$ If $I(x,y,c)-J_{RGB}(x,y,c)-M(x,y,c) < 0, R(x,y,c) = 0$ (12)

wherein R(x,y,c) is the pixel value at the pixel position (x,y) in the c plane of the Rayleigh scattering component image R. Values (pixel values) corresponding to all x, y, and c in the Rayleigh scattering component image R are determined by performing arithmetic processing according to equation (12) for all x, y, and c. In step S1203, the calculation unit 307 stores in the storage unit 315 the Rayleigh scattering component image R generated in step S1202.

<Composite Processing: Step S507>

Details of the processing in step S507 will be described. A pixel value $J_{out}$(x,y,c) at the pixel position (x,y) in the c plane of a composite image $J_{out}$ is calculated according to equation (13):

$$J_{out}(x,y,c) = J_{RGB}(x,y,c) + m \cdot M(x,y,c) + r \cdot R(x,y,c) \quad (13)$$

where m is the Mie scattering intensity coefficient, and r is the Rayleigh scattering intensity coefficient. In this embodiment, m and r desirably take values between 0 and 1 such as m=0.1 and r=0.5, but may take other values. At this time, if m=0 and r=0, an image specialized in only improvement of contrast without considering color can also be generated. By composing images while arbitrarily changing the m and r values, the ratio of the influence of scattering of light can be controlled. Values (pixel values) corresponding to all x, y, and c in the composite image $J_{out}$ are determined by performing arithmetic processing according to equation (13) for all x, y, and c.

As described above, according to this embodiment, when performing processing of suppressing the influence of a microparticle component in a captured image, a Mie scattering component and Rayleigh scattering component, which are scattering components in the air, can be estimated. These components can be composed at an arbitrary ratio to generate an image in which the visibility and the contrast decreased by the influence of a microparticle component are improved while considering sensor noise.

Second Embodiment

General Description of Second Embodiment

First, the second embodiment will be generally described. In this embodiment, the ratio of pixels of low transmittance that are determined to form a sky region in a captured image is used as a criterion for determining a fog/haze removal processing parameter. The second embodiment is different from the first embodiment in that determination of a sky region is added to fog/haze removal processing, and when it is determined that a sky region is small, a parameter for removing the influence of a microparticle component is changed and removal processing is performed. The difference from the first embodiment will be described below, and the second embodiment is similar to the first embodiment, unless otherwise specified.

<Overall Processing of Image Processing Apparatus 100>

Figure 14:
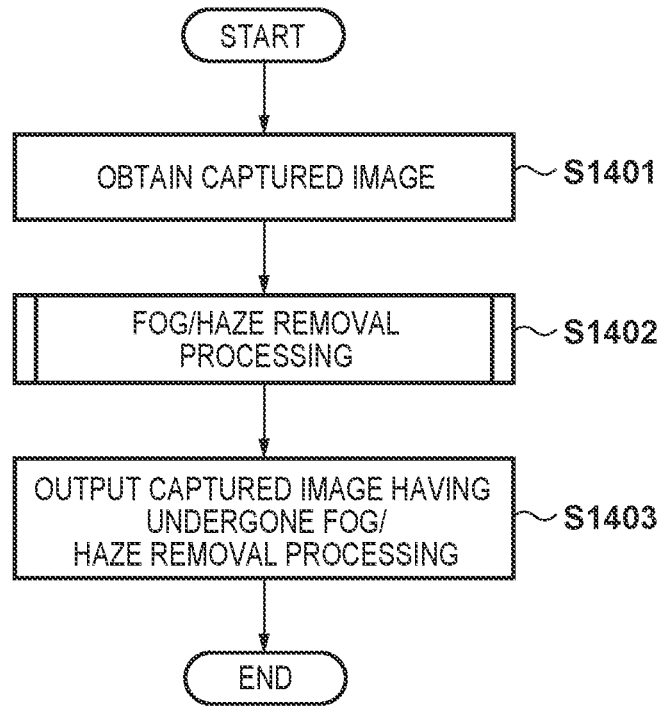
FIG. 14 is a flowchart of overall processing of the image processing apparatus 100.

Processing performed by an image processing apparatus 100 to generate and output a captured image in which "the influence of a microparticle component in the air" in a captured image is suppressed will be described with reference to the flowchart of FIG. 14.

In step S1401, an obtaining unit 201 obtains a captured image sent from an image capturing unit 111 and stores the obtained captured image in a storage unit 204. In step S1402, a processing unit 202 performs removal processing as processing for suppressing the influence of a microparticle component on the captured image stored in the storage unit 204 in step S1401. The processing unit 202 then stores the captured image having undergone microparticle removal processing in a storage unit 205. Details of the processing in step S1402 will be described later. In step S1403, an output unit 203 outputs the captured image stored in the storage unit 205 in step S1402 to an HDD 105 via an HDD I/F 104, and the captured image is saved in the HDD 105.

<Microparticle Removal Processing>

Figure 15:
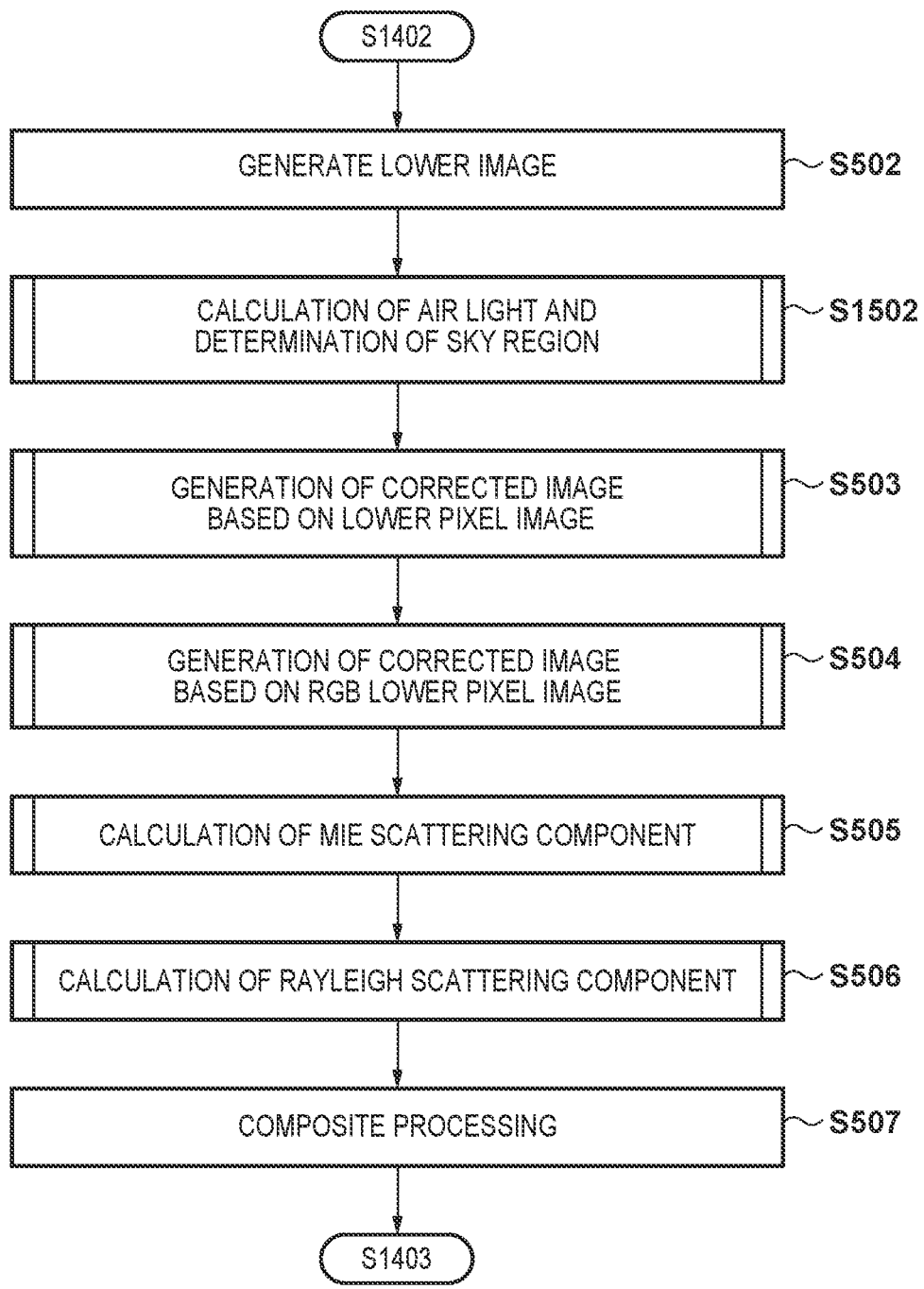
FIG. 15 is a flowchart showing details of processing in step S1402.

Details of the fog/haze removal processing in step S1402 will be explained with reference to the flowchart of FIG. 15. The second embodiment is different from the first embodiment in calculation of an air light component and determination of a sky region. This processing corresponds to step S1502.

In step S1502, a calculation unit 301 determines whether the captured image stored in the storage unit 204 contains a large sky region. If the calculation unit 301 determines that the sky region is small, it changes a parameter used to calculate an air light component, obtains (estimates) the air light component using the changed parameter, and stores the obtained air light component in a storage unit 309. Details of the processing in step S1502 will be described later.

<Determination of Sky Region and Calculation of Air Light Component: Step S1502>

Figure 16:
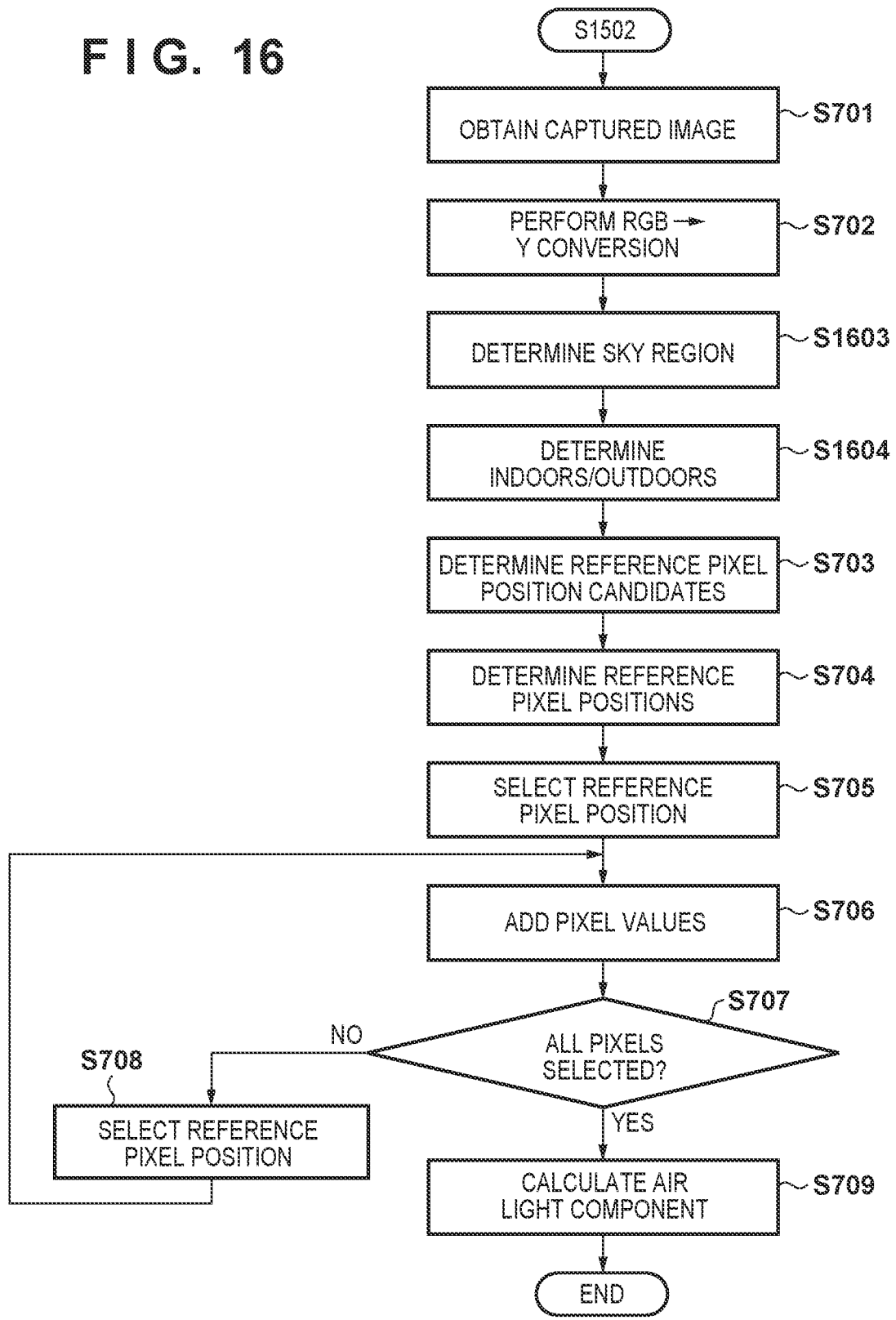
FIG. 16 is a flowchart showing details of processing in step S1502.

Details of the processing in step S1502 will be described with reference to the flowchart of FIG. 16. In step S1603, the calculation unit 301 counts the number of pixels (pixels constituting the sky region) each having a luminance value higher than a threshold among pixels constituting a luminance image obtained by conversion in step S702.

In step S1604, the calculation unit 301 determines whether the ratio of "the number of pixels counted in step S1603" to the total number of pixels of the luminance image is equal to or higher than the threshold (for example, 20%). If the calculation unit 301 determines that the ratio of "the number of pixels counted in step S1603" to the total number of pixels of the luminance image is equal to or higher than the threshold, it determines that the captured image is an image captured outdoors. If the calculation unit 301 determines that the ratio of "the number of pixels counted in step S1603" to the total number of pixels of the luminance image is lower than the threshold, it determines that the captured image is an image captured indoors.

If the calculation unit 301 determines that the captured image is an image captured indoors, it sets 92% as the specified ratio used in step S703. In contrast, if the calculation unit 301 determines that the captured image is an image captured outdoors, it sets 99% as the specified ratio used in step S703.

In this embodiment, which of an image captured indoors and an image captured outdoors is a captured image is determined based on the number of pixels each having a pixel value equal to or higher than the threshold in a luminance image. However, the method of determining which of an image captured indoors and an image captured outdoors is a captured image is not limited to a specific method. For example, if the ratio of "the number of pixels each having a pixel value equal to or higher than the threshold in the upper half region of a luminance image" to the total number of pixels of the luminance image is equal to or higher than a threshold, it is determined that the captured image is an image captured outdoors; if the ratio is lower than the threshold, it is determined that the captured image is an image captured indoors.

In this embodiment, the specified ratio is changed in accordance with which of an image captured indoors and an image captured outdoors is a captured image. However, the parameter to be changed is not limited to the specified ratio, and another parameter such as the coefficient ω used when determining a transmittance distribution may be changed instead of or in addition to the specified ratio.

As described above, according to this embodiment, the parameter for suppressing the influence of a microparticle component can be changed in accordance with which of an image captured indoors and an image captured outdoors is a captured image, and then processing can be performed.

In this embodiment, it is determined which of an indoor scene or an outdoor scene is a scene in which a captured image was captured. However, the scene may be determined from a larger number of types of scenes, and the parameter may be set (controlled) in accordance with the determined scene.

Third Embodiment

The numerical values and equations used in the above description are used to make a detailed explanation and are not intended to limit the above-described embodiments to the numerical values and equations used. Some or all of the above-described embodiments may be properly combined and used. Some or all of the above-described embodiments may be selectively used.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-026670, filed Feb. 18, 2019, which is hereby incorporated by reference herein in its entirety.

What is claimed is:

1. An image processing apparatus comprising:
one or more memories including instructions; and
one or more processors executing the instructions to cause the image processing apparatus to function as:
a first obtaining unit configured to obtain a range of a distance, which is designated in accordance with a user operation; and
a generation unit configured to generate a corrected image in which influence of a microparticle component in air on a captured image is suppressed based on the range.

2. The apparatus according to claim 1, wherein the one or more processors execute the instructions to cause the image processing apparatus to further function as a second obtaining unit configured to specify based on a luminance value of the captured image, a plurality of pixel positions to be referred to in the captured image, and to obtain, based on a sum of pixel values at the plurality of pixel positions for each color, an air light component, which is a light component scattered by the air,
wherein the generation unit generates the corrected image based on the air light component.

3. The apparatus according to claim 2, wherein the generation unit generates a plurality of correction images by correcting the captured image based on the air light component and the range, estimates a Mie scattering component and Rayleigh scattering component of the captured image based on the correction images and the captured image, and generates the corrected image based on the estimated Mie scattering component and Rayleigh scattering component.

4. The apparatus according to claim 3, wherein the generation unit obtains a pixel value of a pixel of interest of a first image based on a plurality of lower pixel values among pixel values of a pixel of interest in the captured image and pixels surrounding the pixel of interest for each color, corrects a transmittance distribution based on the first image to make an outside of the range no transmission in the transmittance distribution, and generates a first correction image by correcting the captured image based on the corrected transmittance distribution and the air light component.

5. The apparatus according to claim 4, wherein the generation unit corrects a plane of each color in the captured image based on the air light component, obtains a pixel value of the corrected plane of a pixel of interest of a second image based on a plurality of lower pixel values among pixel values of a pixel of interest in the corrected plane and pixels surrounding the pixel of interest for each the corrected plane, corrects a transmittance distribution based on the second image to make an outside of the range no transmission in the transmittance distribution, and generates a second correction image by correcting the captured image based on the corrected transmittance distribution and the air light component.

6. The apparatus according to claim 5, wherein the generation unit generates, based on the captured image and the first correction image, a Mie scattering component image, which is an image equivalent to a Mie scattering component in the captured image.

7. The apparatus according to claim 6, wherein the generation unit generates, based on the captured image, the second correction image, and the Mie scattering component image, a Rayleigh scattering component image, which is an image equivalent to a Rayleigh scattering component in the captured image.

8. The apparatus according to claim 7, wherein the generation unit generates a composite image of the second correction image, the Mie scattering component image, and the Rayleigh scattering component image as the corrected image in which the influence of the microparticle component in the air on the captured image is suppressed.

9. The apparatus according to claim 2, wherein the one or more processors execute the instructions to cause the image processing apparatus to further function as a determination unit configured to determine a sky region in the captured image,
wherein the second obtaining unit calculates the air light component using a pixel value of the sky region.

10. The apparatus according to claim 1, wherein the captured image is a captured image of a scene in which the microparticle component is appeared.

11. The apparatus according to claim 1, wherein the one or more processors execute the instructions to cause the image processing apparatus to further function as a unit configured to determine, based on a luminance value of the captured image, whether the captured image is an image captured indoors or an image captured outdoors, and to control a parameter of the generation unit based on a result of the determination.

12. The apparatus according to claim 1, wherein the generation unit obtains a range of a transmittance in the captured image in accordance with the range obtained by the first obtaining unit.

13. The apparatus according to claim 12, wherein the one or more processors execute the instructions to cause the image processing apparatus to further function as a display unit configured to display a graphical user interface,
wherein the first obtaining unit accepts the user operation via the graphical user interface.

14. The apparatus according to claim 13, wherein the graphical user interface can designate a shortest distance and longest distance subjected to processing.

15. The apparatus according to claim 13, wherein the graphical user interface is a slide bar.

16. The apparatus according to claim 12, wherein the generation unit generates a transmittance distribution based on the captured image, corrects the transmittance distribution based on the range of the transmittance, and generates the corrected image using the corrected transmittance distribution.

17. The apparatus according to claim 1, wherein the generation unit generates the corrected image not to perform correction processing in a region of pixels not included in the range.

18. An image processing method comprising:
obtaining a range of a distance, which is designated in accordance with a user operation; and
generating a corrected image in which influence of a microparticle component in air on a captured image is suppressed based on the range.

19. A non-transitory computer-readable storage medium storing a computer program for causing a computer to function as:
an obtaining unit configured to obtain a range of a distance, which is designated in accordance with a user operation; and
a generation unit configured to generate a corrected image in which influence of a microparticle component in air on a captured image is suppressed based on the range.

* * * * *